United States Patent
Kimura et al.

(10) Patent No.: US 10,274,890 B2
(45) Date of Patent: Apr. 30, 2019

(54) CLEANING BLADE

(71) Applicant: NOK CORPORATION, Tokyo (JP)

(72) Inventors: Natsumi Kimura, Kanagawa (JP); Katsumi Abe, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 16/065,206

(22) PCT Filed: Dec. 22, 2016

(86) PCT No.: PCT/JP2016/088453
§ 371 (c)(1),
(2) Date: Jun. 22, 2018

(87) PCT Pub. No.: WO2017/111060
PCT Pub. Date: Jun. 29, 2017

(65) Prior Publication Data
US 2019/0011871 A1  Jan. 10, 2019

(30) Foreign Application Priority Data

Dec. 25, 2015 (JP) .................. 2015-255288

(51) Int. Cl.
*G03G 21/00* (2006.01)
*B32B 27/40* (2006.01)
*C08J 7/04* (2006.01)

(52) U.S. Cl.
CPC ......... *G03G 21/0017* (2013.01); *B32B 27/40* (2013.01); *C08J 7/04* (2013.01)

(58) Field of Classification Search
CPC .................................................. G03G 21/2017
USPC ........................................................... 399/350
See application file for complete search history.

(56) References Cited

U.S. PATENT DOCUMENTS

| 7,778,585 B2 | 8/2010 | Uchida et al. |
| 8,160,486 B2 | 4/2012 | Inoue et al. |
| 2004/0240915 A1* | 12/2004 | Nakayama ......... G03G 21/0017 399/345 |

(Continued)

FOREIGN PATENT DOCUMENTS

| EP | 3 086 184 A1 | 10/2016 |
| JP | H08-248851 A | 9/1996 |

(Continued)

OTHER PUBLICATIONS

International Search Report, dated Mar. 7, 2017, from corresponding PCT application No. PCT/JP2016/088453.

*Primary Examiner* — Quana Grainger
(74) *Attorney, Agent, or Firm* — Young & Thompson

(57) ABSTRACT

Provided is a cleaning blade having an elastic body that is a molding of a rubber substrate and having at least a surface-treatment layer at a position that contacts a contact-receiving site on the elastic body. The surface-treatment layer contains a cured product from an isocyanate group reaction product of a difunctional isocyanate compound with a difunctional polyol and a trifunctional polyol wherein the molar ratio of the difunctional polyol to the trifunctional polyol (difunctional/trifunctional) is 50/50 to 95/5. The cured product reacts via the isocyanate group with the polymer forming the elastic body, and the surface-treatment layer has a thickness of at least 10 μm and not more than 100 μm.

4 Claims, 1 Drawing Sheet

(56) References Cited

U.S. PATENT DOCUMENTS

| | | | | |
|---|---|---|---|---|
| 2009/0003905 A1* | 1/2009 | Ueno | ................ | G03G 21/0017 399/350 |
| 2010/0031466 A1* | 2/2010 | Abe | ................ | G03G 21/0017 15/256.5 |
| 2016/0313690 A1 | 10/2016 | Kimura et al. | | |

FOREIGN PATENT DOCUMENTS

| | | | |
|---|---|---|---|
| JP | 2004-280086 | A | 10/2004 |
| JP | 2007-052062 | A | 3/2007 |
| JP | 2007-163676 | A | 6/2007 |
| JP | 2009-025451 | A | 2/2009 |
| JP | 2009-063993 | A | 3/2009 |
| WO | 2015/093441 | A1 | 6/2015 |
| WO | 2016-133006 | A1 | 8/2016 |

* cited by examiner

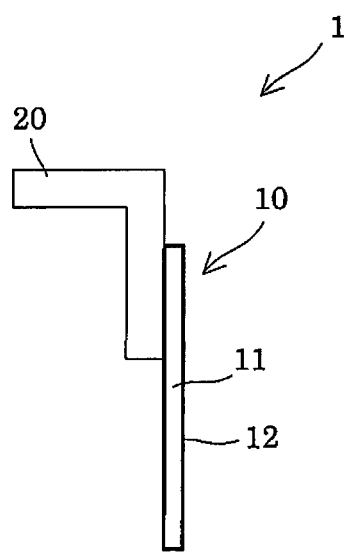

CLEANING BLADE

TECHNICAL FIELD

The present invention relates to a cleaning blade for use in an image-forming device such as an electrophotographic copying machine or printer, or a toner-jet copying machine or printer.

BACKGROUND ART

In a general electrophotographic process, an electrophotographic photoreceptor undergoes processes including at least cleaning, charging, light exposure, development, and image transfer. The process employs a cleaning blade for removing toner remaining on the surface of a photoreceptor drum, a conductive roller for uniformly imparting electric charge to the photoreceptor, a transfer belt for transferring a toner image, and the like. From the viewpoints of plastic deformation and wear resistance, the cleaning blade is usually produced from a thermosetting polyurethane resin.

However, when a cleaning blade formed of a polyurethane resin is employed, the friction coefficient between the blade member and a photoreceptor drum increases, and delamination of the blade and anomalous sound problematically occur. Also, the driving torque of the photoreceptor drum must be increased in some cases. Furthermore, the edge of the cleaning blade may be caught by a photoreceptor drum or another member, whereby the cleaning blade is stretched or cut, and the edge of the cleaning blade is broken due to wear. These problems become severe particularly when the cleaning blade has low hardness. As a result, the durability of the cleaning blade may be impaired.

In order to solve the aforementioned problems, the contact portion of a polyurethane blade has been modified to have high hardness and low friction. In one proposed procedure, a polyurethane blade is impregnated with an isocyanate compound, to thereby induce reaction between the polyurethane resin and the isocyanate compound, whereby the hardness is enhanced at only the surface or a portion near the surface of the polyurethane resin blade, and friction of the surface is reduced (see, for example, Patent Documents 1 to 3).

However, when characteristics required for such a blade are attained through methods disclosed in Patent Documents 1 to 3, the polyurethane resin blade must be impregnated with a surface treatment liquid containing an isocyanate compound at high concentration. In this case, the treated surface layer (hereinafter may be referred to as a surface treatment layer) must be formed to a considerable depth. When a high-concentration surface treatment liquid is used, and a thick surface treatment layer is formed, an excessive amount of isocyanate tends to remain on the surface of the blade, thereby requiring an additional step of removing the excessive isocyanate. In contrast, when the thickness of the surface treatment layer is reduced, wear resistance decreases, thereby problematically impairing cleaning performance.

PRIOR ART DOCUMENTS

Patent Documents

Patent Document 1: Japanese Patent Application Laid-Open (kokai) No. 2007-052062
Patent Document 2: Japanese Patent Application Laid-Open (kokai) No. 2009-025451
Patent Document 3: Japanese Patent Application Laid-Open (kokai) No. 2004-280086

SUMMARY OF THE INVENTION

Problems to be Solved by the Invention

In view of the foregoing, an object of the present invention is to provide a cleaning blade which has high hardness and provides low friction despite a small thickness of the surface treatment layer, which exhibits excellent wear resistance, and which ensures excellent cleaning performance for a long period of time.

Means for Solving the Problems

In one mode of the present invention for solving the aforementioned problems, there is provided a cleaning blade, having an elastic body formed of a rubber base material molded product, and a surface treatment layer provided on at least an area of the elastic body to be brought into contact with a cleaning object, characterized in that:

the surface treatment layer contains a cured product of an isocyanate group reaction product of a bi-functional isocyanate compound with a bi-functional polyol and a tri-functional polyol;

the isocyanate group reaction product has a mole ratio (2-function/3-function) of the bi-functional polyol to the tri-functional polyol of 50/50 to 95/5;

the cured product has reacted with a polymer forming the elastic body via isocyanate groups; and the surface treatment layer has a thickness of 10 µm to 100 µm.

According to the present invention, a bi-functional polyol and a tri-functional polyol are used at a specific ratio and are reacted with a bi-functional isocyanate compound. As a result, the reaction can proceed at higher efficiency, as compared with a similar case where an isocyanate compound is solely used, whereby a cured product having a highly cross-linked structure can be yielded. Thus, there can be provided a cleaning blade which has high hardness and provides low friction despite a small thickness of the surface treatment layer, which exhibits excellent wear resistance, and which ensures excellent cleaning performance for a long period of time. Also, when a bi-functional polyol and a tri-functional polyol are used in combination, the cross-linking density of the cured product can be further elevated, as compared with a similar case where a bi-functional polyol or a tri-functional polyol is solely used. Furthermore, since the surface treatment layer is as has a thickness as small as 10 µm to 100 µm, remaining of the surface treatment liquid and deposition after drying thereof can be suppressed, whereby coating of the surface with an excessive amount of isocyanate compound can be prevented.

Preferably, in the isocyanate group reaction product, the bi-functional isocyanate compound has a molecular weight of 200 to 300, and the bi-functional polyol and the tri-functional polyol have a molecular weight of 150 or lower.

According to the above mode, reaction of the bi-functional isocyanate compound with the bi-functional polyol and the tri-functional polyol efficiently proceeds, to thereby efficiently form a surface treatment layer.

Preferably, the ratio of isocyanate groups present in the bi-functional isocyanate compound in the isocyanate group reaction product to hydroxyl groups present in at least one species selected from the bi-functional polyol and the tri-functional polyol (NCO groups/OH groups) is 1.0 to 1.5.

According to the above mode, reaction of the bi-functional isocyanate compound with the bi-functional polyol and the tri-functional polyol proceeds efficiently, to thereby form a surface treatment layer which has high hardness and provides low friction.

Effects of the Invention

The present invention realizes a cleaning blade which has high hardness and provides low friction despite a small thickness of the surface treatment layer, which exhibits excellent wear resistance, and which ensures excellent cleaning performance for a long period of time. Also, since the thickness of the surface treatment layer is as small as 10 µm to 100 µm, coating of the surface with an excessive amount of isocyanate compound can be prevented.

BRIEF DESCRIPTION OF THE DRAWINGS

FIG. 1 A cross-section of an example of the cleaning blade of the present invention.

MODES FOR CARRYING OUT THE INVENTION

The cleaning blade of the present invention for use in an image-forming device will next be described in detail.

Embodiment 1

As shown in FIG. 1, a cleaning blade 1 has a blade main body (also referred to as "cleaning blade") 10, and a supporting member 20. The blade main body 10 is joined to the supporting member 20 by means of an adhesive (not illustrated). The blade main body 10 is formed of an elastic body 11, which is a molded product of a rubber base material. The elastic body 11 has a surface treatment layer 12 formed at a surface portion thereof. The surface treatment layer 12 is formed by impregnating the surface portion of the elastic body 11 with the surface treatment liquid and hardening the liquid. The surface treatment layer 12 may be formed on at least an area of the elastic body 11 to be brought into contact with a cleaning object. However, in Embodiment 1, the surface treatment layer 12 is formed on the entire surface of the elastic body 11 so as to serve as the surface portion.

The surface treatment liquid used for forming the surface treatment layer 12 is a liquid mixture containing a bi-functional isocyanate compound, a bi-functional polyol and a tri-functional polyol, and an organic solvent; or a liquid mixture containing a prepolymer and an organic solvent, the prepolymer being an isocyanate group-containing compound having an isocyanate group at a terminus thereof, which compound is a reaction product of the bi-functional isocyanate compound with the bi-functional polyol and the tri-functional polyol. These surface treatment liquids are appropriately chosen in consideration of wettability to the elastic body 11, the degree of impregnation, and the shelf life of the surface treatment liquid.

In the surface treatment agent, the ratio of isocyanate groups present in the bi-functional isocyanate compound contained in the surface treatment liquid to hydroxyl groups present in the bi-functional polyol and the tri-functional polyol (NCO groups/OH groups) is 1.0 to 1.5. When the ratio of the isocyanate groups to the hydroxyl groups (NCO groups/OH groups) is smaller than 1.0, unreacted polyol remains, to thereby cause whitening and softening of the product, whereas when the ratio is greater than 1.5, unreacted isocyanate remains, to thereby cause browning of the product. Thus, when the ratio of the isocyanate groups to the hydroxyl groups (NCO groups/OH groups) is smaller than 1.0, or greater than 1.5, the produced surface treatment layer fails to have high hardness and provide low friction, thereby failing to attain excellent cleaning performance and wear resistance.

Furthermore, the surface treatment layer 12 is formed at a surface portion of the elastic body 11 so as to have a thickness of 10 µm to 100 µm, preferably 10 µm to 50 µm. Such a thickness is very small and about 1/10 the thickness of a conventional surface treatment layer 12. However, the produced cleaning blade has high hardness, provides low friction, and exhibits excellent wear resistance. That is, by use of the surface treatment liquid containing a bi-functional isocyanate compound, a bi-functional polyol and a tri-functional polyol, and an organic solvent; or a prepolymer obtained through the reaction thereof, the reaction of the bi-functional isocyanate compound with the bi-functional polyol and the tri-functional polyol, and the reaction between the prepolymer and the elastic body 11 efficiently proceed, whereby the surface treatment layer 12 having a high crosslinking density is formed at a surface portion of the elastic body 11. The surface treatment layer 12 can be formed at a surface portion of the elastic body 11 without using a high-concentration surface treatment liquid. Thus, there can be prevented coating of the surface of the elastic body with an excess amount of the isocyanate compound, and a conventionally employed removal step of removing an excessive isocyanate compound can be omitted.

The surface treatment layer 12 preferably has an elastic modulus (in the present invention, an indentation elastic modulus (Young's modulus), the same being applied throughout the specification) of 40 MPa or lower. When the elastic modulus of the surface treatment layer 12 is in excess of 40 MPa, the surface treatment layer 12 cannot follow deformation of the elastic body 11, resulting in chipping of the surface treatment layer 12.

Also, the elastic modulus of the elastic body 11 is preferably 5 MPa to 20 MPa. When the elastic modulus of the elastic body 11 is adjusted to be smaller than 5 MPa, the contact target (i.e., a photoreceptor drum in Embodiment 1) receives elevated torque, thereby reducing the filming suppression effect. As used herein, the concept "filming" refers to a phenomenon of toner adhesion onto a photoreceptor drum. In contrast, when the elastic modulus of the elastic body 11 is adjusted to exceed 20 MPa, sufficient adhesion between the photoreceptor drum and the cleaning blade fails to be attained. Furthermore, the difference in elastic modulus between the surface treatment layer 12 and the elastic body 11 is preferably 3 MPa or more. When the difference in elastic modulus between the surface treatment layer 12 and the elastic body 11 is smaller than 3 MPa, sufficient filming suppression effect fails to be attained.

Next will be described the surface treatment liquid formed of a liquid mixture containing a bi-functional isocyanate compound, a bi-functional polyol and a tri-functional polyol, and an organic solvent;

Examples of the bi-functional isocyanate compound employed in the surface treatment liquid include 4,4'-diphenylmethane diisocyanate (MDI), isophorone diisocyanate (IPDI), 4,4'-dicyclohexylmethane diisocyanate (H-MDI), trimethylhexamethylene diisocyanate (TMHDI), carbodiimide-modified MDI, polymethylenepolyphenyl polyisocyanate, 3,3-dimethyldiphenyl-4,4'-diisocyanate (TODI), naphthylene diisocyanate (NDI), lysine diisocyanate methyl ester (LDI), oligomers thereof, and modified products thereof. Among bi-functional isocyanate compounds, those having a molecular weight of 200 to 300 are preferably used. Among the above isocyanate compounds, 4,4'-diphenylmethane diisocyanate (MDI) and 3,3'-dimethyldiphenyl-4,4'-diisocyanate (TODI) are preferred. By use of a bi-functional isocyanate compound having a molecular weight of 200 to 300, the reaction between the isocyanate and the tri-functional polyol consistently proceeds, and the surface portion of the elastic body 11 can be impregnated with the surface treatment liquid within a short period of time. As a result, the produced cleaning blade has high hardness and provides low friction despite a small thickness of the surface treatment layer 12.

Particularly when the elastic body 11 is formed of a polyuyrethane, the bi-functional isocyanate compound has high affinity to the polyurethane, to thereby enhance integral joining of the surface treatment layer 12 to the elastic body 11. As a result, the surface treatment layer 12 can exhibit higher hardness and provide lower friction. In contrast, when the tri-functional isocyanate compound is used, cross-linking reaction stops at a certain extent of reaction due to heavy stearic hindrance. Thus, a bi-functional isocyanate compound, which can consistently react with the tri-functional polyol, must be used as the isocyanate compound.

Examples of the bi-functional polyol include ethylene glycol (EG), diethylene glycol (DEG), propylene glycol (PG), 1,3-propanediol (PDO), 1,4-butanediol (BD), hexanediol, and 1,6-hexanediol (HD).

Examples of the tri-functional polyol include tri-functional aliphatic polyols such as glycerin, 1,2,4-butanetriol, trimethylolethane (TME), trimethylolpropane (TMP), and 1,2,6-hexanetriol; polyether triols formed through addition of ethylene oxide, butylene oxide or the like to a tri-functional aliphatic polyol; and polyester triols formed through addition of a lactone or the like to a tri-functional aliphatic polyol. Among such tri-functional polyols, a tri-functional polyol having a molecular weight of 150 or lower is preferably used.

The lower the molecular weight of the bi-functional or tri-functional polyol, the faster the reaction between the polyol and the bi-functional isocyanate, to form a hard cured product. In this case, a surface treatment layer having high hardness can be formed. Thus, the molecular weight is preferably 150 or lower.

When the surface treatment liquid contains a tri-functional polyol, three hydroxyl groups react with isocyanate groups, to thereby form the surface treatment layer 12 having a 3-dimensional structure and a high cross-linking density. Thus, even when the surface treatment layer 12 having a small thickness is formed by use of a low-concentration surface treatment liquid, the surface treatment layer 12 has high hardness and provides low friction. In addition, as described in the Examples below, the surface treatment liquid containing the bi-functional isocyanate compound and the tri-functional polyol has a long effective period and shelf life.

No particular limitation is imposed on the organic solvent, so long as it can dissolve the bi-functional isocyanate compound, bi-functional polyol, and tri-functional polyol. However, an organic solvent having no active hydrogen which can react with the isocyanate compound is suitably used. Examples of the organic solvent include methyl ethyl ketone (MEK), methyl isobutyl ketone (MIBK), tetrahydrofuran (THF), acetone, ethyl acetate, butyl acetate, toluene, and xylene. The organic solvent has higher solubility as the boiling point thereof decreases. Such a solvent can reduce the drying time after impregnation of the elastic body with the surface treatment liquid. As a result, uniform treatment can be attained. Notably, these organic solvents are appropriately chosen in accordance with the degree of swelling of the elastic body 11. Thus, methyl ethyl ketone (MEK), acetone, and ethyl acetate are preferably used.

In the case where a surface treatment liquid formed of a liquid mixture containing a bi-functional isocyanate compound, a tri-functional polyol, and an organic solvent is used, when a surface portion of the elastic body 11 is impregnated with the surface treatment liquid and then subjected to a curing treatment, the bi-functional isocyanate compound reacts with the tri-functional polyol, to thereby form a prepolymer product having an isocyanate group at a terminus thereof, concomitant with curing. The remaining terminal isocyanate group of the cured product reacts with the elastic body 11, to thereby yield the surface treatment layer 12 including the cured product.

In the case of a surface treatment liquid containing an isocyanate group-containing compound having a terminal isocyanate group, which compound is a reaction product of the bi-functional isocyanate compound with the bi-functional polyol and the tri-functional polyol, firstly, a prepolymer, which is an isocyanate group-containing compound having a terminal isocyanate group, is synthesized through preliminary reaction of the bi-functional isocyanate compound with the bi-functional polyol and the tri-functional polyol. Then, the thus-synthesized prepolymer is mixed with an organic solvent, to thereby prepare the surface treatment liquid.

The aforementioned formation of prepolymer from the bi-functional isocyanate compound, the bi-functional polyol, and the tri-functional polyol may be completed during impregnation of the surface portion of the elastic body 11 with the surface treatment liquid. However, the extent of the reaction may be controlled through tuning reaction temperature, reaction time, and process atmosphere. Generally, the formation of prepolymer is performed under the conditions including a surface treatment liquid temperature of 5° C. to 35° C. and an ambient humidity of 20% to 70%.

In any of the above cases, the ratio of isocyanate groups present in the bi-functional isocyanate compound of the surface treatment liquid to hydroxyl groups present in the bi-functional polyol and the tri-functional polyol of the liquid (NCO groups/OH groups) is preferably 1.0 to 1.5. When the ratio is smaller than the lower limit, unreacted polyol remains, to thereby possibly cause whitening and softening of the product, whereas when the ratio is greater than the upper limit, unreacted isocyanate remains, to thereby possibly cause browning of the product.

Notably, in any of the above cases, the surface treatment liquid may additionally contain, in accordance with needs, a cross-linking agent, a catalyst, a curing agent, or the like. In relation to the effective components, the bi-functional isocyanate compound concentration, the bi-functional polyol concentration, and the tri-functional polyol concentration, or the bi-functional isocyanate compound concentration during the reaction of the bi-functional isocyanate compound with the bi-functional polyol and the tri-functional polyol may be appropriately modified in consideration of solubility in the organic solvent and impregnation performance with respect to the surface portion. However, each concentration is preferably 3 mass % to 30 mass %, more preferably 5 mass % to 20 mass %.

The elastic body 11 is formed of a matrix having active hydrogen. Examples of the rubber base material forming the matrix having active hydrogen include polyurethane, epichlorohydrin rubber, nitrile rubber (NBR), styrene rubber (SBR), chloroprene rubber, and EPDM. Of these, polyurethane is preferred, from the viewpoint of reactivity to the bi-functional isocyanate compound. Examples of the rubber base material formed of polyurethane include those mainly comprising at least one species selected from among aliphatic polyethers, polyesters, and polycarbonates. More specifically, such a rubber base material is mainly formed of a polyol containing at least one species selected from among aliphatic polyethers, polyesters, and polycarbonates, the polyol molecules being bonded via urethane bond. Examples of preferred polyurethanes include polyether-based polyurethane, polyester-based polyurethane, and polycarbonate-based polyurethane. Alternatively, instead of urethane bond, there may be used a similar elastic body employing polyamide bond, ester bond, or the like. Yet alternatively, a thermoplastic elastomer such as polyether-amide or polyether-ester may also be used. Also, in addition to, or instead of a rubber base material having active hydrogen, a filler or a plasticizer having active hydrogen may be used.

No particular limitation is imposed on the rubber hardness of the elastic body 11. An example of the elastic body 11 having low hardness (e.g., a Shore A hardness of 70° or lower) is particularly preferred, since the formed surface treatment layer has considerably high hardness and exhibits high elastic modulus. Meanwhile, through employment of an example of the elastic body 11 having high hardness, the hardness of the surface treatment layer can be further enhanced. Thus, such an example is very suitable for an article provided with a surface treatment layer having considerably high hardness.

The surface portion of the elastic body 11 is impregnated with the surface treatment liquid, and the liquid is hardened, to thereby form a cured product. The isocyanate groups of the cured product react with active hydrogen, whereby the surface treatment layer 12 containing the cured product is formed at the surface portion of the elastic body 11. No particular limitation is imposed on the method of impregnating the surface portion of the elastic body 11 with the surface treatment liquid and hardening the liquid. In one specific procedure, the elastic body 11 is immersed in the surface treatment liquid, and then the elastic body is heated. In another procedure, the surface treatment liquid is applied (e.g., sprayed) onto the surface of the elastic body 11 for impregnation, and then the elastic body is heated. No particular limitation is imposed on the heating method, and examples include heating, forced drying, and natural drying.

More specifically, when a liquid mixture of the bi-functional isocyanate compound, the bi-functional polyol, the tri-functional polyol, and the organic solvent is used as a surface treatment liquid, the surface treatment layer 12 is formed via reaction of the bi-functional isocyanate compound with the bi-functional polyol and the tri-functional polyol, to form a prepolymer concomitant with hardening, during impregnation of the surface portion of the elastic body 11 with the surface treatment liquid, and reaction of the terminal isocyanate groups with the elastic body 11.

In the case where the prepolymer is used as the surface treatment liquid, the surface treatment layer 12 is formed by impregnating the surface portion of the elastic body 11 with the surface treatment liquid, and hardening the applied liquid, and also through reaction of the terminal isocyanate groups with a polymer forming the elastic body 11.

The surface treatment layer 12 is formed on at least an area of the elastic body 11 to be brought into contact with a contact object. For example, the surface treatment layer 12 may be formed on only a front end area of the elastic body 11, or on the entire surface of the elastic body 11.

Alternatively, after fabrication of a cleaning blade by bonding the elastic body 11 to the supporting member 20, the surface treatment layer 12 may be formed only on the front end area of the elastic body 11, or on the entire surface of the elastic body. Yet alternatively, the surface treatment layer 12 may be formed on one or both surfaces or the entire surface of a rubber molded product, before cutting the elastic body 11 into a blade shape, and then the rubber molded product is cut.

According to the present invention, the surface portion of the elastic body 11 is impregnated with the surface treatment liquid containing a bi-functional isocyanate compound, a bi-functional polyol and a tri-functional polyol, and an organic solvent; or with a prepolymer obtained through the reaction thereof, and the coating is cured. As a result, a surface treatment layer having considerably small thickness of 10 μm to 100 μm, preferably 10 μm to 50 μm, but exhibiting high hardness and low friction can be formed at the surface portion of the elastic body 11. A cleaning blade having such a surface treatment layer exhibits excellent wear resistance, and ensures excellent cleaning performance, filming-suppression effect, and other favorable properties consistently for a long period of time. In addition, since the surface treatment layer is very thin, coating of the surface of the elastic body with an excess amount of the isocyanate compound can be prevented.

EXAMPLES

The present invention will next be described in detail by way of examples, which should not be construed as limiting the invention thereto.

Example 1

Production of Rubber Elastic Body

A caprolactone-based polyol (molecular weight: 2,000) (100 parts by mass) serving as the polyol, and 4,4'-diphenylmethane diisocyanate (MDI) (38 parts by mass) serving as the isocyanate compound were allowed to react at 115° C. for 20 minutes. Subsequently, 1,4-butanediol (6.1 parts by mass) and trimethylolpropane (2.6 parts by mass), serving as cross-linking agents, were added thereto, and the mixture was transferred to a metal mold maintained at 140° C. and heated for hardening for 40 minutes. Then, the product was cut into pieces of the urethane elastic body having dimensions of 12.3 mm in width, 2.0 mm in thickness, and 324 mm in length.

Preparation of Surface Treatment Liquid

A bi-functional MDI (product of Nippon Polyurethane Industry Co., Ltd., molecular weight: 250.25) serving as an isocyanate compound, a bi-functional polyol 1,3-propanediol (PDO) (product of Kanto Kagaku, molecular weight: 76.09), a tri-functional polyol TMP (product of Nippon Polyurethane Industry Co., Ltd., molecular weight: 134.17), and methyl ethyl ketone (MEK) were mixed together, such that the ratio of isocyanate groups present in the bi-functional isocyanate compound to hydroxyl groups present in the bi-functional polyol and the tri-functional polyol (NCO groups/OH groups) was adjusted to 1.2, to thereby prepare a surface treatment liquid having a concentration of 10 mass %. Also, the ratio in the number of functional groups of the bi-functional polyol to the tri-functional polyol (2-function/3-function) was adjusted to 60/40. Notably, the surface treatment liquid concentration (mass %) was defined as the ratio of the total mass of the isocyanate compound and the polyols polyol to the entire mass of the surface treatment liquid.

Surface Treatment of Urethane Elastic Body

While the surface treatment liquid was maintained at 23° C., the urethane elastic body was immersed in the surface treatment liquid for 1 minute. The thus-treated urethane elastic body was attached to a supporting member and heated for one hour in an oven maintained at 50° C., to thereby yield a cleaning blade provided with a surface treatment layer having a thickness of 30 μm at a surface portion thereof.

The thickness of the surface treatment layer was measured by means of Dynamic Ultra Micro Hardness Tester (product of Shimadzu Corporation) according to JIS 22255 and ISO 14577. Specifically, the surface hardness of the rubber elastic body was measured, and then the rubber elastic body was subjected to the surface treatment. The rubber elastic body was cut, and the hardness profile from the cut surface to the inside of the rubber elastic body was measured. The depth where the percent change in hardness from the surface to the depth of 10 μm was 30% or less was determined. The thus-determined depth (length) was employed as the thickness of the surface treatment layer.

Example 2

A rubber elastic body was produced through the same procedure as employed in Example 1. The rubber elastic body was surface-treated through the same procedure as employed in Example 1, except that the ratio in the number of functional groups of the bi-functional polyol to the tri-functional polyol (2-function/3-function) was adjusted to 85/15, to thereby yield a rubber elastic body having, at a surface portion thereof, a surface treatment layer having a thickness of 30 μm. Subsequently, the thus-surface-treated rubber elastic body was joined to a supporting member, to thereby fabricate a cleaning blade.

Comparative Example 1

A rubber elastic body was produced through the same procedure as employed in Example 1. The rubber elastic body was surface-treated through the same procedure as employed in Example 1, except that TMP (product of Nippon Polyurethane Industry Co., Ltd., molecular weight: 134.17) was used as the sole tri-functional polyol, to thereby yield a rubber elastic body having, at a surface portion thereof, a surface treatment layer having a thickness of 30 μm. Subsequently, the thus-surface-treated rubber elastic body was joined to a supporting member, to thereby fabricate a cleaning blade.

Comparative Example 2

A rubber elastic body was produced through the same procedure as employed in Example 1. The rubber elastic body was surface-treated through the same procedure as employed in Example 1, except that 1,3-propanediol (PDO) (product of Kanto Kagaku, molecular weight: 76.09) was used as the sole bi-functional polyol, to thereby yield a rubber elastic body having, at a surface portion thereof, a surface treatment layer having a thickness of 30 μm. Subsequently, the thus-surface-treated rubber elastic body was joined to a supporting member, to thereby fabricate a cleaning blade.

Comparative Example 3

A rubber elastic body was produced through the same procedure as employed in Example 1. The rubber elastic body was surface-treated through the same procedure as employed in Example 1, except that a bi-functional polyol 1,3-propanediol (PDO) (product of Kanto Kagaku, molecular weight: 76.09) and a tri-functional polyol TMP (product of Nippon Polyurethane Industry Co., Ltd., molecular weight: 134.17) were used in such amounts that the ratio in the number of functional groups of the bi-functional polyol to the tri-functional polyol (2-function/3-function) was adjusted to 40/60, to thereby yield a rubber elastic body having, at a surface portion thereof, a surface treatment layer having a thickness of 30 μm. Subsequently, the thus-surface-treated rubber elastic body was joined to a supporting member, to thereby fabricate a cleaning blade.

Each of the rubber elastic bodies and cleaning blades obtained in Examples 1 and 2 and Comparative Examples 1 to 3 was assessed in terms of dynamic friction coefficient, indentation elastic modulus of the surface treatment layer, surface hardness, surface roughness, cleaning performance, filming suppression, wear resistance, and appearance. The effective period of each surface treatment liquid was also determined. The measurement and evaluation were performed through the following procedures.

Test Example 1

<Measurement of Dynamic Friction Coefficient>

Dynamic friction coefficient of each blade piece was measured by means of a surface property tester (product of Shinto Scientific Co., Ltd.) in accordance with JIS K7125, P8147, and ISO 8295. An SUS304 steel ball (diameter: 10 mm) was used as a counter friction member. The dynamic friction coefficient was measured at a moving speed of 50 mm/min, a load of 0.49 N, and an amplitude of 50 mm.

Test Example 2

<Measurement of Indentation Elastic Modulus>

Indentation elastic modulus of each blade piece was measured by means of a dynamic ultramicro hardness meter (product of Shimadzu Corporation) in accordance with ISO 14577. A load-unload test was conducted at a retention time of 5 s, a maximum load of 0.98 N, and a loading speed of 0.14 N/s, whereby the indentation elastic modulus of the surface treatment layer was determined.

Test Example 3

<Measurement of Surface Hardness>

Each blade piece was subjected to an indentation test by means of a dynamic ultramicro hardness meter (product of Shimadzu Corporation) in accordance with JIS 22255 and ISO 14577. The hardness of the surface of the test blade piece was determined at a loading speed of 1.4 mN/s and a measurement depth of 10 μm.

Test Example 4

<Measurement of Surface Roughness>

Ten-point mean surface roughness ($R_z$) of each blade piece was determined by means of Surfcom 1400A (product of Toyo Seimitsu Co., Ltd.) in accordance with JIS B0601-1994. Specifically, the roughness of each rubber elastic body was measured at a moving speed of 0.15 mm/s, a cut-off wavelength of 0.8 mm, a loading speed of 1.4 mN/s, and a measurement depth of 10 μm.

Test Example 5

<Cleaning Performance>

Each test blade was attached to a cartridge, and the cartridge was employed in TASK alfa 5550ci (product of KYOCERA Corporation). A printing job (1,000,000 sheets) was conducted. The cleaning performance after the printing job was assessed as "○" when no break-through of toner was observed, "Δ" when slight (but practically not problematic) break-through of toner was observed, and as "X" when any break-through of toner was observed.

Test Example 6

<Suppression of Filming>

Each test blade was attached to a cartridge, and the cartridge was employed in an A3-size color MFP (55 sheets/min). A printing job (1,000,000 sheets) was conducted. The filming suppression property after the printing job was assessed as "○" when no adhesion of toner was observed, as "Δ" when slight (but practically not problematic) adhesion of toner was observed, and as "X" when any adhesion of toner was observed.

Test Example 7

<Wear Resistance>

Each test blade was attached to a cartridge, and the cartridge was employed in TASK alfa 5550ci (product of KYOCERA Corporation). A printing job (1,000,000 sheets) was conducted. The wear resistance after the printing job was assessed as "○" when no chipping or wear was observed, as "Δ" when slight chipping (but not problematic in practice) was observed, and as "X" when any chipping or wear was observed.

Test Example 8

<Appearance of Printed Sheet>

Each test blade was attached to a cartridge, and the cartridge was employed in TASK alfa 5550ci (product of KYOCERA Corporation). A printing job (1,000,000 sheets) was conducted. The appearance of the printed sheets after the printing job was assessed as "○" when no print failure was observed, as "Δ" when slight print failure (but not problematic in practice) was observed, and as "X" when any print failure was observed.

Test Example 9

<Life (Effective Period) of Surface Treatment Liquid>

Each of the prepared surface treatment liquids (400 g) was placed in a 500-mL container, and the container was closed. The liquid was maintained at 40° C., and the time (days) until any change in appearance was observed was checked. The life of the surface treatment liquid was assessed as "○" when no change in appearance was observed for 2 days or longer, as "Δ" when slight change in appearance (but not problematic in practice) was observed within 2 days, and as "X" when any change in appearance was observed within 2 days.

Test Results

Table 1 shows results of Test Examples 1 to 9. As shown in Table 1, Examples 1 and 2, employing a surface treatment liquid containing a bi-functional isocyanate compound and a bi-functional polyol and a tri-functional polyol at a specific 2-function/3-function ratio, exhibited excellent cleaning performance, filming suppression, wear resistance, appearance, and life of surface treatment liquid, all rated with "○." Also, Examples 1 and 2 exhibited dynamic friction coefficient, indentation elastic modulus, surface hardness, and surface roughness, at levels allowable to use in practice.

Comparative Example 2, employing a surface treatment liquid containing a bi-functional isocyanate and a bi-functional polyol, exhibited filming suppression rated with "Δ," a level allowable to use in practice. Comparative Example 1, employing a surface treatment liquid containing a bi-functional isocyanate and a tri-functional polyol, exhibited filming suppression and wear resistance rated with "Δ," levels allowable to use in practice. Both cases were not favorable. Comparative Example 3, employing a surface treatment liquid containing a bi-functional isocyanate compound and both a bi-functional polyol and a tri-functional polyol with a smaller bi-functional ratio, exhibited filming suppression rated with "Δ," and the hardness of the surface treatment layer was poor. Thus, Comparative Example 3 was not favorable.

As described above, by employing a surface treatment liquid containing a bi-functional isocyanate compound and both a bi-functional polyol and a tri-functional polyol with a specific ratio and forming a surface treatment layer including a cured product having a specific composition and a highly crosslinked structure, cleaning performance, filming suppression, wear resistance, appearance, and effective period of a surface treatment liquid were found to be reliably enhanced. The cleaning blade of the present invention having such a rubber elastic body is highly reliable. The cleaning blade has high hardness and provides low friction despite a small thickness of the surface treatment layer, and exhibits excellent wear resistance and ensures excellent cleaning performance for a long period of time.

TABLE 1

| | | Ex. 1 | Ex. 2 | Comp. Ex. 1 | Comp. Ex. 2 | Comp. Ex. 3 |
|---|---|---|---|---|---|---|
| Surface treatment liquid | | Bi-functional isocyanate compd. + polyol | | | | |
| Blend ratio | Polyol function | bi-/tri-function | bi-/tri-function | bi-/tri-function | bi-/tri-function | bi-/tri-function |
| | (bi/tri mole ratio) | (60/40) | (85/15) | (0/100) | (100/0) | (40/60) |
| | NCO/OH | 1.2 | 1.2 | 1.2 | 1.2 | 1.2 |
| | Concn. (wt. %) | 10 | 10 | 10 | 10 | 10 |
| Treatment conditions | Impregnation thickness (μm) | 30 | 30 | 30 | 30 | 30 |
| Evaluation | Dynamic friction coeff. | 1.5 | 1.6 | 1.7 | 1.6 | 1.6 |
| | Indentation elastic modulus (MPa) | 12 | 13 | 9 | 11 | 10 |
| | Surface hardness | 0.11 | 0.12 | 0.10 | 0.10 | 0.10 |
| | Surface roughness (μm) | 0.3 | 0.4 | 0.3 | 0.3 | 0.3 |

TABLE 1-continued

|  | Ex. 1 | Ex. 2 | Comp. Ex. 1 | Comp. Ex. 2 | Comp. Ex. 3 |
|---|---|---|---|---|---|
| Cleaning performance | ○ | ○ | ○ | ○ | ○ |
| Filming suppression | ○ | ○ | Δ | Δ | Δ |
| Blade wear resistance | ○ | ○ | Δ | ○ | ○ |
| Appearance | ○ | ○ | ○ | ○ | ○ |
| Life of impregnation liquid | ○ 2 days | ○ 2 days | ○ 2 days | ○ 2 days | ○ 2 days |

INDUSTRIAL APPLICABILITY

The cleaning blade of the present invention is suitably employed as a cleaning blade, a conductive roller, a transfer belt, or the like, which is employed in an image-forming device such as an electrophotographic copying machine or printer, or a toner-jet copying machine or printer. However, the use is not limited to the above. For example, the cleaning blade of the present invention may be used as rubber parts such as a sealing member, a rubber hose for industrial use, a rubber belt for industrial use, a wiper, an automobile weather strip, and a glass run channel.

DESCRIPTION OF REFERENCE NUMERALS

1: cleaning blade
10: blade main body
11: elastic body
12: surface treatment layer
20: supporting member

The invention claimed is:

1. A cleaning blade, having an elastic body formed of a rubber base material molded product, and a surface treatment layer provided on at least an area of the elastic body to be brought into contact with a cleaning object, characterized in that:
   the surface treatment layer contains a cured product of an isocyanate group reaction product of a bi-functional isocyanate compound with a bi-functional polyol and a tri-functional polyol;
   the isocyanate group reaction product has a mole ratio (2-function/3-function) of the bi-functional polyol to the tri-functional polyol of 50/50 to 95/5;
   the cured product has reacted with a polymer forming the elastic body via isocyanate groups; and
   the surface treatment layer has a thickness of 10 μm to 100 μm.

2. A cleaning blade according to claim 1, wherein:
   the bi-functional isocyanate compound in the isocyanate group reaction product has a molecular weight of 200 to 300, and
   each of the bi-functional polyol and the tri-functional polyol in the isocyanate group reaction product has a molecular weight of 150 or lower.

3. A cleaning blade according to claim 1, wherein:
   in the isocyanate group reaction product, the ratio of isocyanate groups present in the bi-functional isocyanate compound to hydroxyl groups present in the bi-functional polyol and the tri-functional polyol (NCO groups/OH groups) is 1.0 to 1.5.

4. A cleaning blade according to claim 2, wherein:
   in the isocyanate group reaction product, the ratio of isocyanate groups present in the bi-functional isocyanate compound to hydroxyl groups present in the bi-functional polyol and the tri-functional polyol (NCO groups/OH groups) is 1.0 to 1.5.

* * * * *